Sept. 10, 1957 L. C. BEARER 2,805,899
ADJUSTABLE PEBBLE FEEDER FOR GAS LIFT CONDUIT
Original Filed Sept. 8, 1952
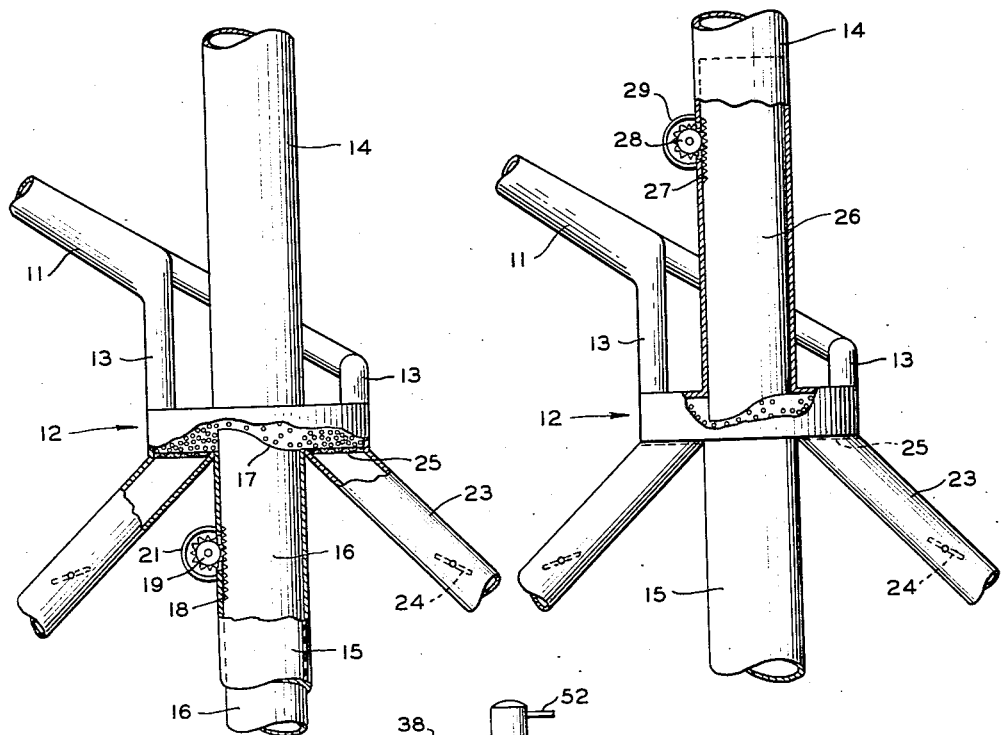
FIG. 1
FIG. 2
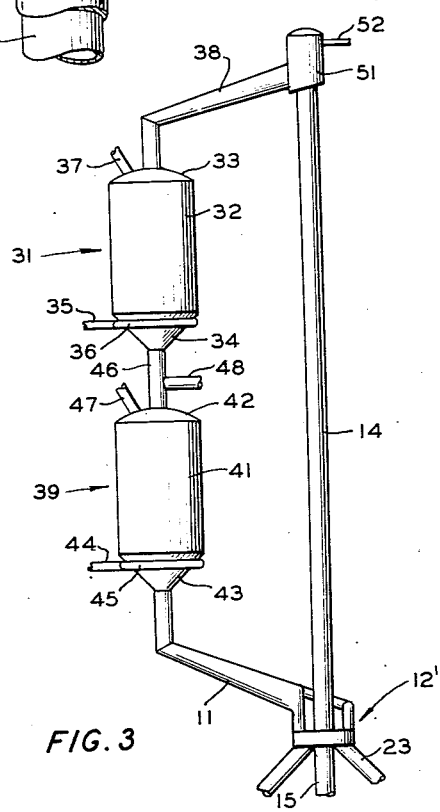
FIG. 3
INVENTOR.
L.C. BEARER
BY *Hudson and Young*
ATTORNEYS

United States Patent Office 2,805,899
Patented Sept. 10, 1957

2,805,899

ADJUSTABLE PEBBLE FEEDER FOR GAS LIFT CONDUIT

Louis C. Bearer, Waco, Tex., assignor to Phillips Petroleum Company, a corporation of Delaware Continuation of abandoned application Serial No. 308,494, September 8, 1952. This application November 18, 1953, Serial No. 392,888

8 Claims. (Cl. 302—53)

This invention relates to pebble heat exchangers. In one of its more specific aspects, it relates to pebble heat exchangers apparatus. In another of its more specific aspects, it relates to improved means for controlling the movement of pebbles through a pebble heat exchanger. In another of its more specific aspects, it relates to a means for feeding pebbles into a gas lift-type elevator. In another of its more specific aspects, it relates to a method for entraining pebbles in a gas lift-type elevator.

This application is a continuation of my application Serial No. 308,494, filed September 8, 1952, now abandoned.

Heat exchangers of the so-called "pebble heater" type have been utilized in recent years for the purpose of heating fluids to elevated temperatures. Such apparatus is especially suited for use in temperature ranges above those at which the best available high temperature structural alloys fail. Thus, such equipment may be used for superheating steam or other gases and for the pyrolysis of hydrocarbons to produce variable products, such as ethylene and acetylene, as well as for other reactions and purposes. Conventional pebble heater type apparatus includes two refractory lined contacting chambers disposed one above the other and connected by a refractory lined passageway or pebble throat of relatively narrow cross section.

Refractory solids of flowable size and form, called "pebbles," are passed continuously and contiguously through the system, flowing by gravity through the uppermost chamber, the throat, and the lowermost chamber, and are then conveyed to the top of the uppermost chamber to complete the cycle.

Solid heat exchange material which is conventionally used in pebble heater apparatus is generally called "pebbles." The term "pebbles" as used herein denotes any solid refractory material of flowable size and form, having strength, which is suitable to carry large amounts of heat from the pebble heating chamber to the gas heating chamber without rapid deterioration or substantial breaking.

Pebbles conventionally used in pebble heater apparatus are ordinarily substantially spherical in shape and range from about 1/8 inch to about 1 inch in diameter. In a high temperature process, pebbles having a diameter of between 1/4 inch to 3/8 inch are preferred. The pebbles must be formed of a refractory material which will stand temperatures at least as high as the highest temperature attained in the pebble heating chamber. The pebbles must also be capable of withstanding temperature changes within the apparatus. Refractory materials, such as metal alloys, ceramics, or other satisfactory material, may be utilized to form such pebbles. Silicon carbide, alumina, periclase, beryllia, Stellite, zirconia and mullite may be satisfactorily used to form such pebbles or may be used in admixture with each other or with other materials. Pebbles formed of such materials, when properly fired, serve very well in high temperatures, some withstanding temperatures up to about 4000° F. Pebbles which are used may be either inert or catalytic as used in any selected process.

The pebbles are heated in one of the chambers (preferably the upper one) by direct contact therein with hot gases, usually combustion products, to temperatures generally in the range of 1400° F. to 3200° F. The hot pebbles are thereafter contacted with the fluid to be superheated or reacted, as the case may be, in the other chamber. Generally, pebble inlet temperatures in the lower chamber are about 50° F. to 200° F. below the highest temperature of the pebbles within the upper chamber. In processes for the production of ethylene from light hydrocarbons, such as ethane, propane, or butane, the pebble temperature in the reaction chamber is usually in the range of 1200° F. to 1800° F. For the production of acetylene by pyrolysis of hydrocarbons, temperatures in the range of 1600° F. to 3000° F. are desirable.

In the past, considerable trouble has been encountered in obtaining fine and critical control of the flow of pebbles into an elevator utilized for returning the pebbles from the lower end of the lowermost chamber to the upper end of the uppermost chamber. Conventional feeding mechanisms which have been used for providing controlled flow of pebbles from the lower end portion of pebble heat exchangers include star valves, gate valves, vibratory feeders and rotatable table feeders. These conventional feeders have normally been positioned within the conduit extending between the lower end portion of the lowermost pebble heat exchange chamber and the pebble elevator. These pebble feeders were initially used in connection with mechanical pebble elevators. More recent practice in pebble heat exchangers has been to utilize a gas lift for the purpose of elevating pebbles to the uppermost pebble heat exchange chamber. Trouble has been encountered, when using the conventional feeders, in obtaining uniform flow and entrainment of the pebbles in a gas lift without subjecting these pebbles to considerable mechanical shock during the initial entrainment thereof. It has also been difficult to obtain different closely controllable rates of pebble flow in the gas lift-type elevator. I have devised a means whereby a closer control of pebble flow is obtained.

Each of the following objects of the invention is attained by at least one aspect of this invention.

An object of this invention is to provide improved pebble heat exchange apparatus. Another object of the invention is to provide improved pebble feeding means. Another object of the invention is to provide means for controlling the volume flow of pebbles to a pebble elevator. Another object of the invention is to provide means for entraining pebbles in a gas lift-type elevator with a minimum of mechanical shock to the pebbles. Another object of the invention is to provide an improved means for entraining pebbles at a controlled flow rate in a gas lift-type elevator. Other and further objects and advantages will be apparent to those skilled in the art upon study of the accompanying discussion and the drawings.

Broadly speaking, this invention comprises a means and method for controlling the rate of flow of solid particles, such as pebbles, into a gas lift. A primary lift gas conduit is coaxially disposed with respect to the lower end of an elevator conduit disposed thereabove. A chamber is formed around and connected to the lower end portion of the elevator conduit and is also formed around and connected to the upper end portion of the primary lift gas inlet conduit. Pebble inlet means are connected to the upper end portion of this chamber so as to permit the flow of pebbles downwardly around the lower end of the elevator chamber so as to form a pebble mass having an inverted conical top over the upper end of the primary gas inlet conduit. A plurality of secondary lift gas inlet conduits extend upwardly and inwardly from points around the primary lift gas inlet conduit toward the lower end of the elevator conduit so as to direct secondary lift gas toward the lower end of the elevator conduit and through the pebble mass maintained within the chamber, toward the inverted conical void. A sleeve member is slidably positioned in either the elevator conduit or the primary lift gas inlet conduit and is extendable into the chamber formed around the ends of those conduits. Although the sleeve member can be cut straight across the end extending into the chamber, it is preferred that that portion of the sleeve which extends into the chamber be cut on a bias. The sleeve can be extended into the chamber so as to cut off a portion of the flow of pebbles from the chamber into the flow of gas from the primary lift gas inlet conduit into the elevator conduit. When the sleeve member is cut on a bias, that extended portion of the sleeve is extendable so as to substantially cut off the flow of pebbles from one portion of the chamber while not interfering with the flow of pebbles from the other portion of that chamber.

Better understanding of this invention will be obtained upon study of the accompanying schematic drawings in which:

Figure 1 is a diagrammatic representation of a pebble entraining chamber showing the relative positions of the lower end of the elevator conduit, the upper end portion of the primary gas inlet conduit, the sleeve positioned within the upper end portion of the primary gas inlet conduit and the secondary gas inlet conduits.

Figure 2 is a diagrammatic representation of the pebble entraining chamber showing the relative positions of the respective conduits with the modification of the sleeve being positioned in the lower end of the elevator conduit.

Figure 3 is a schematic view of pebble heater apparatus of this invention.

Referring particularly to Figure 1 of the drawings, pebble inlet conduit 11 extends downwardly from the lower end of the lowermost chamber of the pebble heater apparatus and is connected to pebble entraining chamber 12 by means of a plurality of conduits 13. Chamber 12 is connected at its upper end portion to elevator conduit 14. Primary gas inlet conduit 15 extends upwardly into the lower end of chamber 12 and is coaxially positioned with respect to elevator conduit 14. Sleeve 16 which is slidably positioned within conduit 15 is cut on a bias at its upper end 17 so that on movement of the sleeve upwardly through conduit 15 one side of the sleeve projects from conduit 15 before the other side is extended therefrom. A rack 18 is provided along at least a portion of the length of sleeve 16 and is operatively connected to pinion 19 which is rotatably supported by the wall of conduit 15. Drive member 21, such as a hand wheel, is operatively connected to pinion 19 so as to rotate that pinion member and in turn drive rack 18 and sleeve 16 longitudinally through conduit 15. Secondary gas inlet conduits 23 are connected to the lower end of chamber 12 and extend in a direction toward the lower end of elevator conduit 14. Valves 24 are positioned within the secondary inlet gas conduits so as to control the flow of lift gas therethrough. Screen members 25 are provided at the upper end of each of said secondary lift gas inlet conduits so as to prevent the flow of pebbles downwardly through those conduits.

Referring particularly to Figure 2 of the drawings, parts like those shown in Figure 1 are designated by like numerals. In this modification, sleeve 26 is provided in the lower end portion of elevator conduit 14 and is cut on a bias at its lower end so that when the sleeve is lowered into chamber 12, one side of that sleeve extends into the chamber before the other side. Rack 27 is provided along at least a portion of the length of sleeve 26 adjacent conduit 14 and pinion member 28 is operatively connected to rack 27. Pinion member 28 is rotatably supported on conduit 14 and is rotatably connected to drive means 29.

Referring particularly to the device shown in Figure 3, pebble heater chamber 31 comprises upright elongated shell 32 which is closed at its upper and lower ends by closure members 33 and 34, respectively. Gaseous material inlet conduit 35 is connected to the lower end portion of chamber 31 by means of header member 36. Gaseous effluent outlet conduit 37 extends from the upper end of chamber 31 and pebble inlet conduit 38 extends into the upper end portion of that chamber. Pebble inlet conduit 38 may be a single pebble inlet conduit, as shown, or may be a plurality of conduits which are connected to the upper end of chamber 31 at spaced points in the upper end of that chamber. Reaction chamber 39 comprises an upright elongated shell 41 closed at its upper and lower ends by closure members 42 and 43, respectively. Gaseous material inlet conduit 44 is connected to the lower end of chamber 39 by means of header member 45. Pebble conduit 46 extends downwardly from the lower end of chamber 31 to the upper end of chamber 39. Conduit 46 may be either a single conduit, as shown, or may be a plurality of conduits as desired. Gaseous effluent outlet conduit 47 extends from the upper end of chamber 39. Seal gas conduit 48 is connected to conduit 46 intermediate its ends.

Pebble outlet conduit 11 is connected to the upper end of pebble entraining chamber 12 as disclosed in connection with Figures 1 and 2 of the drawings. Elevator conduit 14 extends upwardly from pebble entraining chamber 12 into the lower end portion of gas-pebble separator chamber 51 which is provided with a gaseous effluent outlet conduit 52 in its upper end portion. Pebble inlet conduit 38 is connected to the lower end of gas-pebble separator chamber 51.

In the operation of the devices shown in the drawings, pebbles are introduced into the upper end of chamber 31 through pebble inlet conduit 38. These pebbles form a gravitating contiguous pebble mass within that chamber. Gaseous heating material is introduced into the lower end of chamber 31 through inlet conduit 35 and header member 36. This heating material may be in the form of pre-heated gases, or may be in the form of fuel and air which may be burned in the interior of chamber 31. The hot gaseous material passes upwardly through the gravitating contiguous pebble mass, heating those pebbles in a direct heat exchange to the desired temperature. Gaseous effluent is removed from the upper end of chamber 31 through effluent outlet conduit 37. Pebbles which have been heated within chamber 31 gravitate through conduit 46 into the upper end portion of chamber 39 wherein the pebbles form a gravitating contiguous pebble mass. Gaseous material which is to be heated or reacted within chamber 39 is introduced into the lower end portion of that chamber through inlet conduit 44 and header member 45. The gaseous material passes upwardly through the gravitating contiguous pebble mass in that chamber, being raised to the desired temperature for conversion or heating and gaseous effluent being removed from that chamber through gaseous effluent outlet conduit 47.

Seal gas is introduced into throat 46 through inlet conduit 48 so as to prevent gaseous materials from flowing from one chamber to the other. Pebbles are removed from the lower end of chamber 39 through conduit 11 and are gravitated into the pebble entraining chamber 12. A plurality of conduits 13 connect conduit 11 to chamber 12. The pebbles gravitate downwardly through the respective inlet conduits and flow inwardly and downwardly from those conduits toward the upper end of primary gas inlet conduit 15. These pebbles form masses of pebbles upon screens 25 which are at the upper end of secondary lift-gas conduit 23. A stream of primary gas, preferably of constant volume, flows upwardly through conduit 15 into elevator conduit 14. A rough control of the entrainment of pebbles and their flow into elevator conduit 14 is obtained by adjusting the flow of secondary gas through conduits 23. Closer control of the entrainment of pebbles is obtained by adjustment of sleeve 16 or sleeve 26 into chamber 12 so as to block off a portion of the chamber between at least one of the inlet conduits and elevator conduit 14 or primary gas inlet conduit 15. Secondary gas flows directly through the masses of pebbles formed on screens 25 so as to entrain portions of those pebbles and carry them into the primary stream of lift-gas. These pebbles are then elevated by the primary gas through elevator conduit 14 into gas-pebble separator 51 wherein the gas and pebbles are separated, the gaseous material being removed from that chamber through effluent outlet conduit 42 and the pebbles gravitating through conduit 38 into the upper end portion of chamber 31.

The use of a sleeve positioned in the primary lift gas inlet conduit is preferred. As pointed out above, it is also preferred that such a sleeve be cut on a bias in its end which extends into the chamber 12. The sleeve positioned in conduit 15 is displaced longitudinally with respect to the primary inlet lift gas conduit 15 so that its upper end extends to substantially the position at the normal angle of repose of the pebbles flowing into chamber 12 from inlet conduits 13. When the sleeve is cut on a bias, the sleeve is displaced longitudinally so that its extended portion is raised above the normal angle of repose of the pebbles flowing into chamber 12 from inlet conduits 13. The exact positioning of the sleeve can be adjusted to obtain the specific degree of pebble flow which is desired. This movement of sleeve 16 by means of drive means 21 and pinion 19 effectively controls the flow of pebbles into elevator conduit 14 and when a sleeve which is cut on a bias is utilized, movement of the sleeve upwardly into chamber 12 effectively prevents the flow of pebbles in any great volume from at least one of the inlet conduits 13.

When the sleeve is positioned in elevator conduit 14, as shown in Figure 2, it is particularly desirable that the end thereof which extends into chamber 12 be cut on a bias since better control of pebble flow is obtained thereby. However, if desired, a sleeve which is uniformly cut at its extended end may be used. In the modification specifically shown in Figure 2, the pebbles can be effectively blocked off at a point intermediate one of the inlet conduits and the elevator conduit 14. This type of operation results in a substantial blockage of the chamber rather than permitting the partial free flow of pebbles from that inlet conduit as will be obtained with the modification shown in Figure 1 of the drawings.

Various modifications of this invention will be apparent to those skilled in the art upon study of the accompanying disclosure. Such modifications are believed to be clearly within the skill of the art and within the spirit and the scope of this disclosure.

I claim:

1. An improved pebble feeder comprising, in combination, an upright elevator conduit, open at its lower end; a primary lift gas inlet conduit disposed coaxially with said elevator conduit and spaced therebelow; a shell disposed coaxially with and between the adjacent ends of said primary lift gas inlet and elevator conduits so as to form a pebble receiving chamber, the bottom end wall of said chamber forming a platform around the upper end of said primary lift gas inlet, and said elevator conduit extending from the top end wall of said chamber; pebble inlet means in the upper end portion of said shell; a sleeve member slidably positioned in one of said conduits without said chamber and extendable coaxially of said conduits into said chamber; actuating means operatively connected to said sleeve so as to move said sleeve longitudinally within its encompassing conduit; a plurality of secondary lift gas inlet conduits connected to the lower end of said shell communicating with said chamber through openings in said platform spaced around said primary lift gas inlet conduit; pebble retaining means across said openings; and flow control means in each of said secondary lift gas inlet conduits.

2. The apparatus of claim 1 wherein said sleeve extends upwardly within said primary gas inlet conduit end and is cut on a bias across the end extendable into said chamber.

3. An improved pebble feeder comprising, in combination: a shell having an upper end wall and a lower end wall; an upright elevator conduit attached to and extending from said upper end wall, and open at its lower end; a primary lift gas inlet conduit disposed coaxially with said elevator conduit and attached to and extending from said lower end wall of said shell, said shell thus forming a pebble receiving chamber between adjacent ends of said conduits; pebble inlet means in the upper end wall of said shell; a sleeve member slidably positioned in one of said conduits without the chamber formed by said shell and extendable coaxially of said conduits into said chamber formed by said shell; and actuating means operatively connected to said sleeve so as to move said sleeve longitudinally within its encompassing conduit.

4. An improved pebble feeder comprising, in combination: a shell having an upper end wall and a lower end wall; an upright elevator conduit attached to and extending from said upper end wall, and open at its lower end; a primary lift gas inlet conduit disposed coaxially with said elevator conduit and attached to and extending from said lower end wall of said shell, said shell thus forming a pebble receiving chamber between adjacent ends of said conduits; pebble inlet means in the upper end wall of said shell; a sleeve member slidably positioned in one of said conduits without the chamber formed by said shell; actuating means operatively connected to said sleeve so as to move said sleeve longitudinally within its encompassing conduit; a plurality of secondary lift gas inlet conduits connected to the lower end of said shell, directed upwardly and inwardly toward the open lower end of said elevator conduit; and flow control means in each of said secondary lift gas inlet conduits.

5. An improved pebble feeder comprising, in combination: a shell having an upper end wall and a lower end wall; an upright elevator conduit attached to and extending from said upper end wall, and open at its lower end; a primary lift gas inlet conduit disposed coaxially with said elevator conduit and attached to and extending from said lower end wall of said shell, said shell thus forming a pebble receiving chamber between adjacent ends of said conduits; pebble inlet means in the upper end wall of said shell; a sleeve member slidably positioned in one of said conduits without the chamber formed by said shell and extendable coaxially of said conduits into said chamber formed by said shell and cut on a bias across the end extendable into said chamber; actuating means operatively connected to said sleeve so as to move said sleeve longitudinally within its encompassing conduit; a plurality of secondary lift gas inlet conduits connected to the lower end of said shell, directed upwardly and inwardly toward the open lower end of said elevator conduit; and flow control means in each of said secondary lift gas inlet conduits.

6. The pebble feeder of claim 5 wherein said sleeve extends upwardly within said primary lift gas inlet conduit.

7. The pebble feeder of claim 5 wherein said sleeve member extends downwardly within said elevator conduit.

8. The pebble feeder of claim 5 wherein a plurality of pebble inlet conduits extend into the upper end of said shell and are positioned above said secondary lift gas inlet conduits.

(References on following page)

References Cited in the file of this patent

UNITED STATES PATENTS

| | | |
|---|---|---|
| 1,337,738 | Von Porat | Apr. 20, 1920 |
| 1,364,532 | Von Porat | Jan. 4, 1921 |
| 2,412,152 | Huff | Dec. 3, 1946 |
| 2,640,731 | Hill | June 2, 1953 |
| 2,653,058 | Bowen | Sept. 22, 1953 |
| 2,662,796 | Shabaker | Dec. 15, 1953 |
| 2,666,731 | Bergstrom | Jan. 19, 1954 |
| 2,674,496 | Thayer | Apr. 6, 1954 |
| 2,676,142 | Crowley | Apr. 20, 1954 |